(12) United States Patent
Zhang et al.

(10) Patent No.: US 6,566,837 B1
(45) Date of Patent: May 20, 2003

(54) POSITION CONTROLLER FOR MOTOR

(75) Inventors: Wennong Zhang, Kitakyushu (JP);
Yasuhiko Kaku, Kitakyushu (JP);
Tadashi Okubo, Kitakyushu (JP);
Masaru Nakano, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/926,685

(22) PCT Filed: Jun. 1, 2000

(86) PCT No.: PCT/JP00/03580

§ 371 (c)(1),
(2), (4) Date: Dec. 3, 2001

(87) PCT Pub. No.: WO00/75739

PCT Pub. Date: Dec. 14, 2000

(30) Foreign Application Priority Data

Jun. 4, 1999 (JP) ............................................. 11/158659
Apr. 19, 2000 (JP) ........................................ 2000/118133

(51) Int. Cl.[7] ................................................. G05D 3/12
(52) U.S. Cl. ........................ 318/610; 318/611; 318/621; 318/632
(58) Field of Search ................................ 318/606, 609, 318/610, 611, 621, 632, 652

(56) References Cited

U.S. PATENT DOCUMENTS 5,134,354 A * 7/1992 Yamamoto et al. ......... 318/609
5,736,824 A * 4/1998 Sato et al. .................... 318/561
5,994,864 A * 11/1999 Inoue et al. ................ 318/568.2
6,184,644 B1 * 2/2001 Eguchi ........................ 318/632
6,204,622 B1 * 3/2001 Tsuruta ....................... 318/609
6,274,994 B2 * 8/2001 Tsutsui ....................... 318/560

FOREIGN PATENT DOCUMENTS

| JP | 3-22114 | 1/1991 |
| JP | 3-32550 | 2/1991 |
| JP | 3-107385 | 5/1991 |
| JP | 6-95744 | 4/1994 |
| JP | 6-318115 | 11/1994 |

* cited by examiner

*Primary Examiner*—Bentsu Ro
(74) *Attorney, Agent, or Firm*—Armstrong, Westerman & Hattori, LLP

(57) ABSTRACT

A position controller for motors for increasing the position loop gain of a full-close control system without causing recurrence of vibration. The controller where a position signal representing the position of a movable table and outputted from straight-line motion position sensing means attached to a straight-line motion mechanism is used as a position feedback signal comprises differentiating means (2) for differentiating a straight-line motion position signal and outputting a straight-line motion speed signal, subtracting means (4) for calculating the difference between a speed command signal and the straight-line motion speed signal, integrating means (3) for integrating a difference signal outputted form the subtracting means, proportional gain means (1) for receiving the output signal from the integrating means, and adding means (19) for adding the output signal form the proportional gain means to the speed command signal and outputting a new speed command Vr.

4 Claims, 12 Drawing Sheets

POSITION CONTROLLER FOR MOTOR

TECHNICAL FIELD

The present invention relates to a position controller for a motor which performs position control based on a loading position signal from a position sensor attached to a load which is driven by the motor.

BACKGROUND ART

Priorly, in a motor controller for driving a direct-acting mechanism by means of a ball screw (hi-lead screw), etc., in general, an angular velocity of a motor is fed back to construct a speed control loop and an angle of the motor is fed back to construct a position control loop. In this case, if the motor comprises only an angle sensor such as a rotary encoder or the like, a position signal of the sensor is subjected to a finite difference operation so as to become an angular velocity signal. Hereinafter, such a control system is referred to as a semi-close control system.

On the other hand, in order to control a direct-acting mechanism with high accuracy, in some cases, a straight-line motion position sensing means such as a liner scale or the like is attached to a movable table of the mechanism, whereby constructing a position control system by means of an output from the sensing means. Hereinafter, such a control system is referred to as a full-close control system.

A block diagram of such a full-close control system is as shown in FIG. 13.

In FIG. 13, 701 denotes a position control portion and the position control gain is $K_p$. 702 denotes a speed-control portion, 703 denotes a motor, and 704 denotes a load (a machine movable portion, a movable table, etc.) Herein, a loading position signal $Y_L$ is subtracted from a position command $Y_r$ so as to determine a position error $e_p$, and this position error $e_p$ is multiplied by the position control gain $K_p$ by the position control portion 701 so that a speed error $e_v$ is determined. A speed feedback signal $V_f$ is subtracted from this speed command $V_r$ so as to determine a speed error $e_v$, based on the speed error $e_v$, a torque command (current command) $T_r$ is determined in the speed control portion 702, and based on this torque signal $T_r$, the motor 703 and the load 704 are driven.

In recent years, demands for higher accuracy and a higher speed have increased in terms of industrial machines and for that purpose, increasing the position loop gain $K_p$ in a full-close system is indispensable. For an increase in the position control gain (or position loop gain), first, it is necessary to increase speed loop gain, however, increasing the gain is difficult due to influence of mechanical resonance characteristics of a ball screw, a nut, etc., of a direct-acting mechanism.

Meanwhile, in the case of a semi-close control system, by applying a widely-known vibration-damping control method by an equivalent rigid model observer (for example, a vibration-damping controller for mechanical vibration as set forth in Japanese Patent Application No. Hei-9-56183) and the like, a mechanical vibration signal that has been sensed by the equivalent rigid model observer is added to a speed command so as to newly become a speed command, whereby making it possible to improve the speed loop gain while suppressing vibration and easily increase loop gain to a value commensurate therewith.

In prior arts, in order to increase the position control gain in full-close control systems, various approaches have been carried out.

In terms of a speed loop of the full-close system, by applying the above-described vibration-damping control, speed gain which is equivalent to that of a semi-close system can be achieved, however, in terms of a position loop, vibration in the control system recurs when the position control gain is increased, therefore, without modification, the upper limit of the position control gain can be obtained only on the order of ½–⅔ of the upper limit value of a semi-close control system. Since a frequency of the recurred vibration is lower than the frequency of vibration that occurs in the speed loop, it cannot be simply considered that a rise in gain in the overall control loop is a cause and causes for the vibration recurrence cannot be clarified (Problem 1).

Apart from a clarification of the causes, priorly, in order to increase the position control gain in full-close systems, various approaches have been carried out.

For example, application of a method (Japanese Unexamined Patent Publication No. Hei-03-110607) can be considered, wherein a signal Xm representing the motor position and a signal XL representing the loading position are added to each other in such a manner as $$k \times XL + (1-k) \times Xm \text{(where } 0 < k < 1)]$$

so as to become a position feedback signal. When k is approximated to 0, since a feedback content of the loading position becomes less, vibration is reduced, however due to spring characteristics of a drive mechanism, the motor position and loading position signal do not coincide with each other, therefore effects of full-close control are lessened and there is no meaning. In the end, in order to obtain full-close effects, the position control gain is to be increased so as to commensurate with k which has been decreased, therefore, substantial position loop gain remains k=1 and the vibration is not eliminated (Problem 2).

Therefore, a method exists for reducing mechanical vibration within a speed loop by feeding back a torsion angular velocity, which is the difference between a speed of a load and a motor speed to a speed command (Japanese Unexamined Patent Publication Hei-1-251210) or a torque command. When reducing vibration that has recurred in a position loop by this method, since a high-frequency content of the motor speed is contained in the torsion angular velocity, vibration with a high frequency then occurs in the speed loop in turn (there is a possibility that high-frequency vibration occurs due to tuning to low-frequency vibration) and, in the end, only simply applying this method does not become a measure against the above-described vibration recurred in the position loop (Problem 3).

Accordingly, it has been considered that increasing the position control gain in the full-close systems by only using the prior methods is virtually impossible. In order to essentially solve these problems, it is necessary to analyze causes for the recurrence of low-frequency vibration in the position loop.

Therefore, it is an object of the present invention to (by analyzing such causes and suggesting a new control method) provide a position controller for a motor where the position control gain $K_p$ in a full-close control system can be increased to a value equivalent to that of a semi-close control system without causing recurrence of vibration and by increasing the position control gain, highly accurate positioning can be performed in a short time.

DISCLOSURE OF THE INVENTION

In order to achieve the above-mentioned object, according to a first aspect of the invention, a position controller for a motor where a position signal representing the position of a movable table and outputted from a straight-line motion position sensing means attached to a straight-line motion mechanism is used as a position feedback signal comprises:

a differentiating means for differentiating the straight-line motion position signal and outputting a straight-line motion speed signal, a subtracting means for calculating the difference between a speed command signal and the straight-line motion speed signal, an integrating means for integrating a difference signal outputted from the subtracting means, a proportional gain means for receiving the output signal from the integrating means, and an adding means for adding an output signal from the proportional gain means to the speed command signal and outputting a new speed command.

In addition, according to a second aspect of the invention, a position controller for a motor where speed control is performed based on a speed signal obtained by differentiating a rotational position signal of the motor and also position control is performed based on a loading position signal from a position sensor attached to a load driven by the motor compresses:

a differentiating means for differentiating the straight-line motion position signal and outputting a loading speed signal, a subtracting means for calculating the difference between the loading speed signal and a speed command signal, a phase adjusting means for performing phase adjustment by inputting a difference signal outputted from the subtracting means into a low-pass filter, a proportional gain means for receiving an output signal from the phase adjusting means, and an adding means for adding an output signal from the proportional gain means to the speed command signal and outputting a new speed command.

In addition, according to a third aspect of the invention, the phase adjusting means performs phase adjustment by inputting a difference signal outputted from the subtracting means into a band-pass filter.

In addition, according to a fourth aspect of the invention, a position controller for a motor where speed control is performed based on a speed signal obtained by differentiating a rotational position signal of the motor and also position control is performed based on a loading position signal from a position sensor attached to a load driven by the motor comprises:

an integrating calculation means for integrating a speed command signal, a subtracting means for calculating the difference between the loading position signal and an integrated signal outputted from the integrating calculation means, a phase adjusting means for performing phase adjustment by inputting a difference signal outputted from the subtracting means into a band-pass filter, a proportional gain means for receiving an output signal from the phase adjusting means, and an adding means for adding an output signal from the proportional gain means to the speed command signal and outputting a new speed command.

According to this position controller for a motor, a difference speed between the loading speed determined by the differentiating means and the speed command is sensed, the difference speed is integrated by the integrating means, and the integrated value is multiplied by gain $K_f$ by the proportional gain means for an addition to the speed signal, wherein said differentiating means, subtracting means for sensing the difference speed, integrating means, and proportional gain means exactly correspond to a vibration-damping controller of a semi-close system where a mechanical vibration signal is sensed and output as a difference speed between an angular velocity of a motor and an estimated angular velocity speed of an equivalent rigid model, thus the gain $K_f$ value of the proportional gain means raises the upper limit of position loop gain $K_p$ without causing recurrence of vibration.

Otherwise, the difference speed between the speed command and loading speed is phase-adjusted by means of the phase adjusting means such as a low-pass filter, a band-pass filter or the like to cancel out a vibration frequency, and the obtained value is multiplied by gain $K_f'$ by means of the proportional gain means for an addition to the speed command, thus the position loop gain $K_p$ can be increased.

BEST MODE FOR CARRYING OUT THE INVENTION

In the present invention, it is considered that in order to thoroughly solve the aforementioned problems of the full-close systems, a clarification of the "phenomenon where vibration with a frequency lower than that of the vibration that has occurred in the speed loop recurs" as mentioned in the description of the prior arts is indispensable. For analysis, first, mechanical resonance characteristics will be described in detail.

Models of a mechanical drive system comprising a ball screw and a nut, etc., having mechanical resonance characteristics are shown in FIGS. 2.

Figure 1:
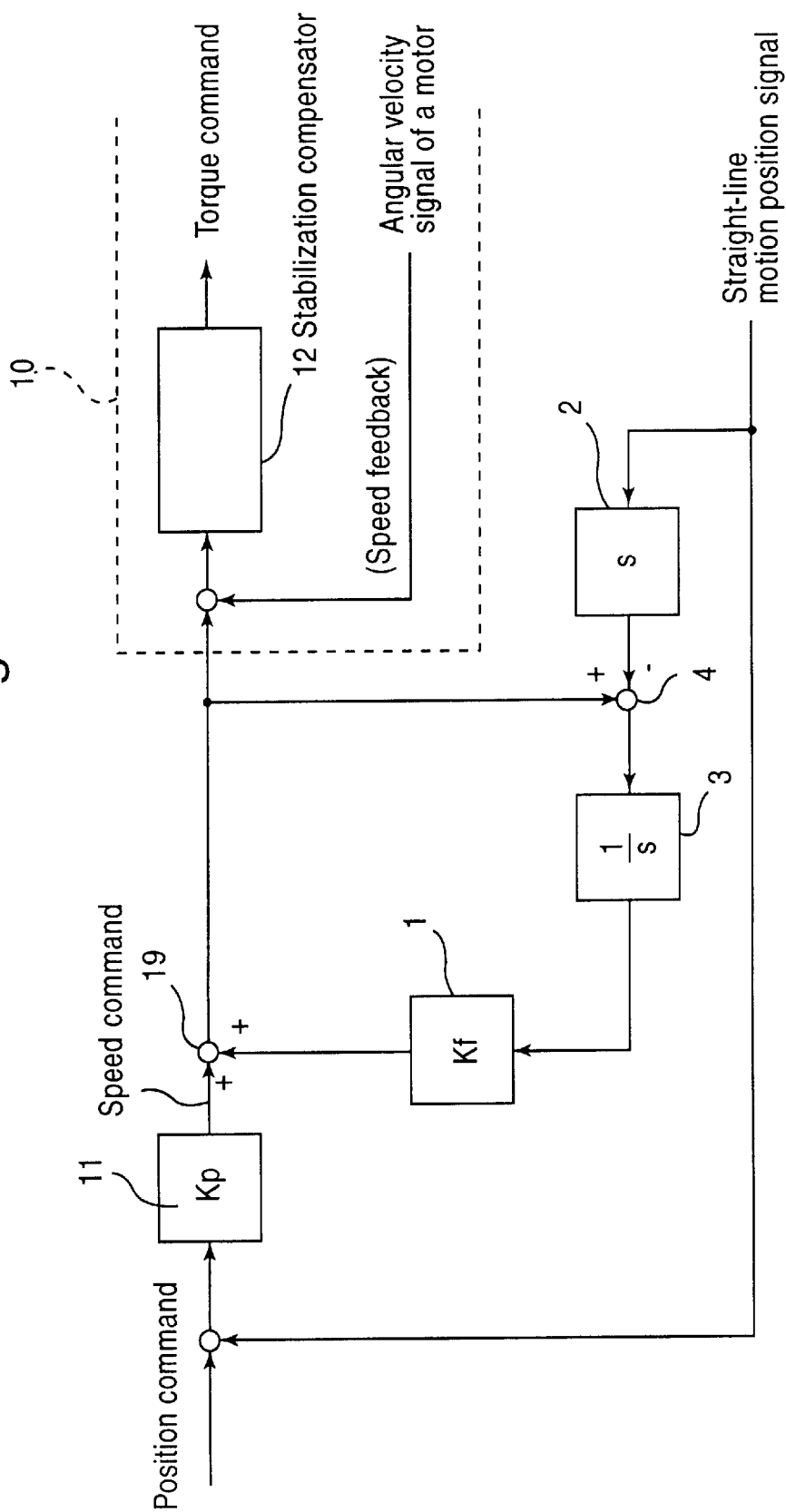
FIG. 1 is a block diagram of the position controller for a motor according to a first embodiment of the present invention.
Figure 2A:
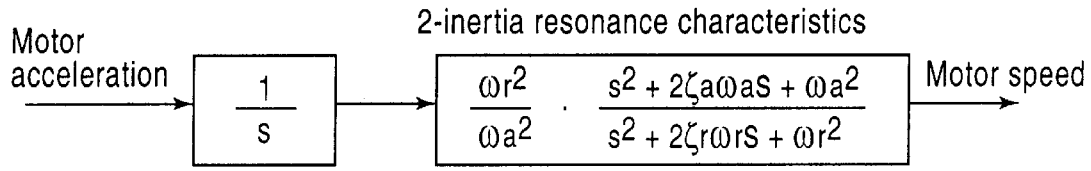
FIGS. 2a to 2c are block diagrams from the motor acceleration to the straight-line motion speed of a load as shown in FIG. 1.

FIG. 2(a) is a block diagram from the motor acceleration to the angular velocity of a motor and when the speed feedback system of FIG. 1 is collectively illustrated in a speed control system, the above block diagram can be derived. In this case, since a reaction force as a result of mechanical resonance is applied to the shaft of the motor, resonance characteristics appear to the angular velocity of the motor as well. For representation thereof, a block representing 2-inertia resonance characteristics is contained between the acceleration and angular velocity in FIG. 2(a). In a transfer function of this 2-inertia resonance characteristics block diagram, the denominator polynomial represents mechanical resonance characteristics and the numerator polynomial represents anti-resonance characteristics. In the diagrams, $\omega_s$ is an anti-resonance angular frequency and $\omega_r$ is a resonance angular frequency.

Figure 2B:
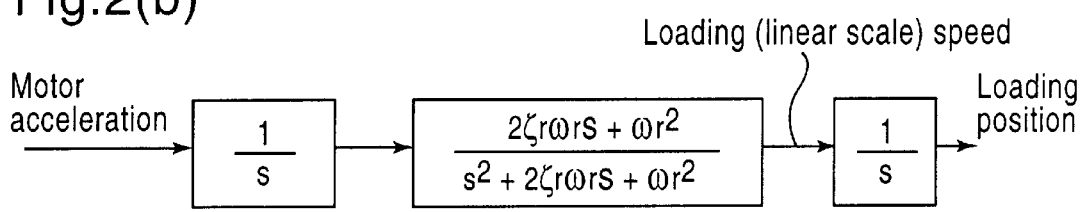

FIG. 2(b) is a block diagram from the motor acceleration to the straight-line motion speed of the movable table of a mechanism, wherein 2-inertia resonance characteristics of a vibrating part is expressed by a quadratic transfer function.

Figure 2C:
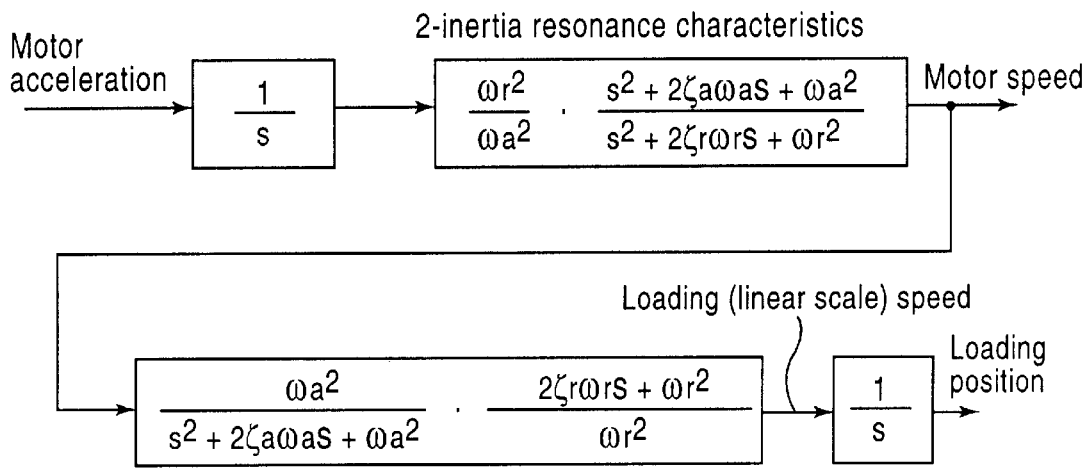

FIG. 2(c) is an aggregate of the block diagrams of FIG. 2(a) and FIG. 2(b) brought together and is a block diagram from the motor acceleration to the angular velocity of a motor as well as to the straight-line motion speed of the movable table of a mechanism.

Figure 3:
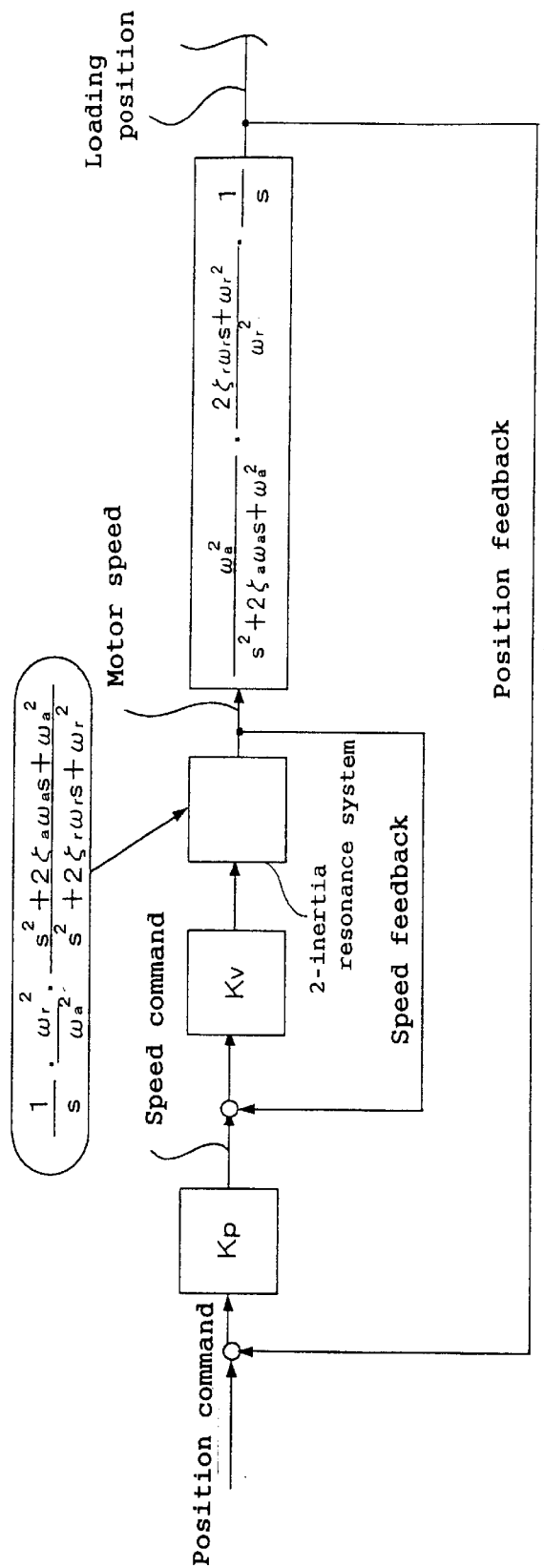
FIG. 3 is a block diagram of a full-close control system constructed based on the models shown in FIG. 2.
Figure 4:
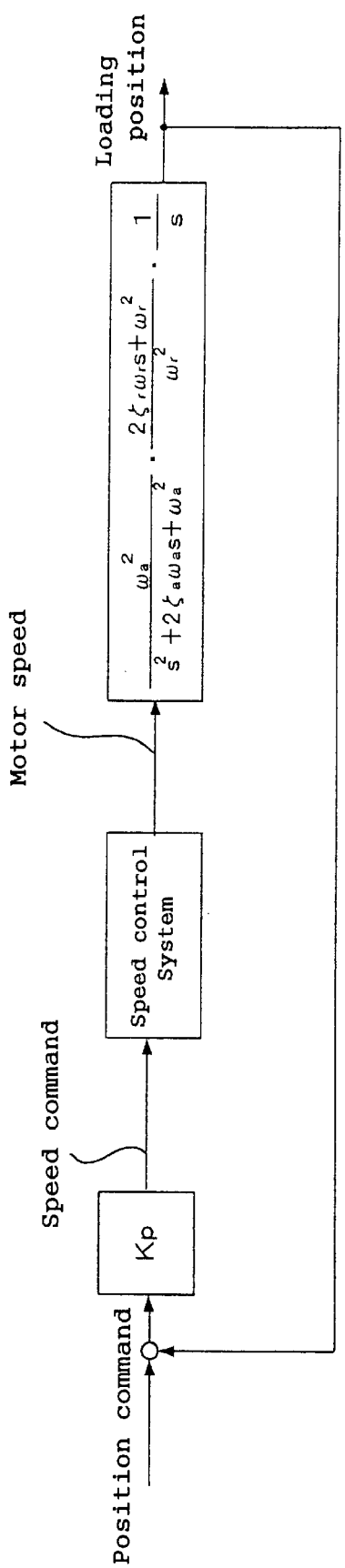
FIG. 4 is a diagram of a simplified speed control system within the position control system shown in FIG. 3.

FIG. 3 shows an example where a full-close control system is constructed based on the model FIG. 2(c) and in the diagram, a speed control system is constructed by feeding back an angular speed signal of the motor and a position control system is constructed by feeding back a straight-line motion position signal. FIG. 4 shows a simplification of FIG. 3. In a case where the 2-inertia resonance system of a speed control system 10 has been stabilized by vibration-damping control, etc., by the foregoing equivalent rigid observer and the like, the speed control system 10 is highly responsive compared to the position control system, therefore, when the transfer function of the speed control system is approximated to 1, a block diagram of FIG. 5 can be derived. It can be understood from FIG. 5 that since resonance characteristics of $\omega_a$ have been contained in the position control loop, if the loop gain is increased, the control system vibrates with a frequency in the vicinity of $\omega_a$.

Figure 5:
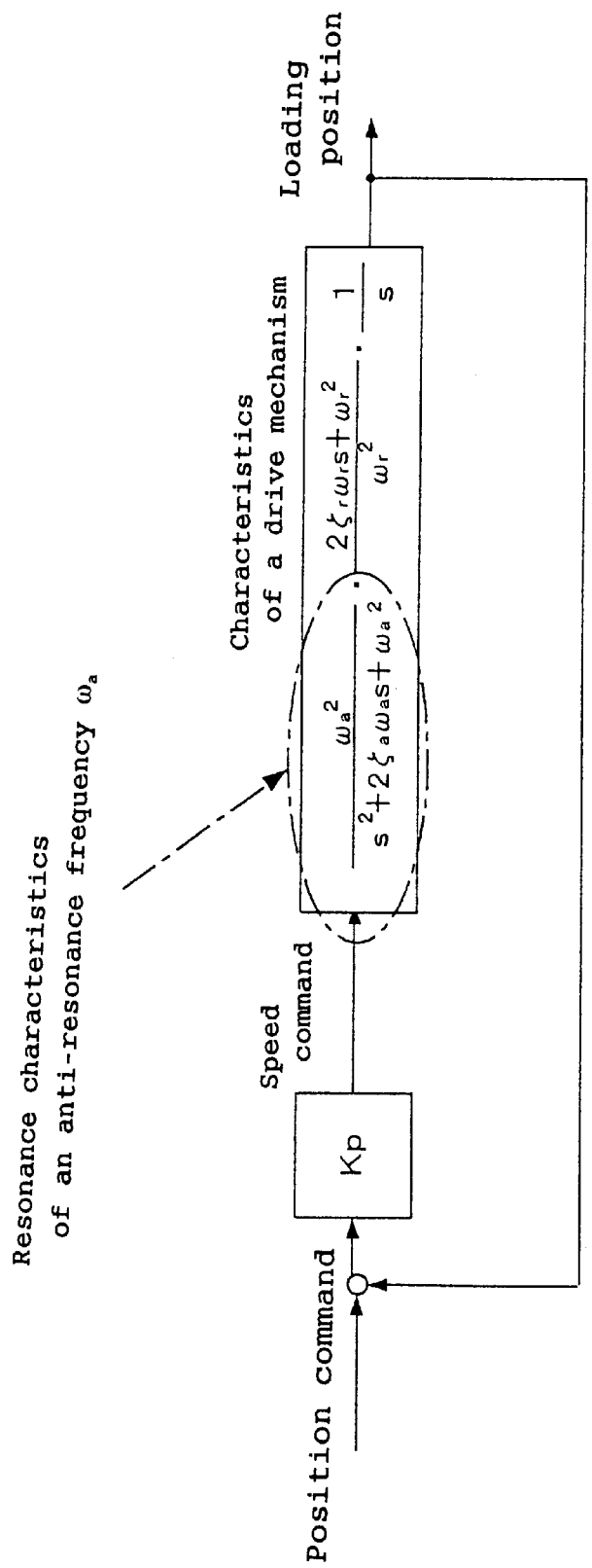
FIG. 5 is a diagram showing a vibrational phenomenon of the position system shown in FIG. 4.
Figure 6:
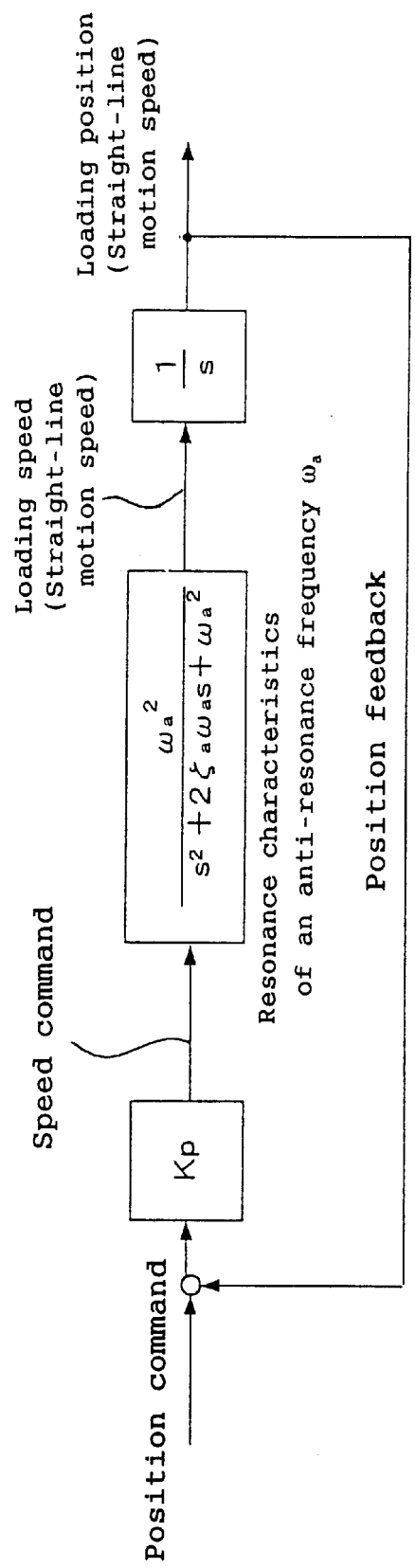
FIG. 6 is a simplified diagram of the position control system shown in FIG. 5.

In the transfer function representing characteristics of the drive mechanism shown in FIG. 5, since $$\omega_r > \omega_s \text{ and } \zeta r \ll 1, \omega_r \gg 2\zeta_r \omega_u \qquad (1)$$

therefore, in the vicinity of a vibration frequency $\omega_a$, an approximation as $$\frac{2\zeta_r s + \omega_r}{\omega_r} \approx 1 \qquad (2)$$

is possible. Accordingly, the position control system of FIG. 5 can be simplified into a block diagram of FIG. 6. When a transfer function from the position command to the loading position is calculated, $$G(s) = \frac{K_p \omega_a 2}{s^3 + 2\zeta_a \omega_a s^2 + \omega_a^2 s + K_p \omega_a^2} \qquad (3)$$

is provided.

Based on expression (3), when Routh-Hurwitz stability conditions are calculated, $$K_p < 2\zeta_a \omega_a \qquad (4)$$

is provided.

Since $\zeta_a$ is on the order of 0.1, irrespective of speed gain $K_v$, the position loop gain $K_p$ value is restricted by expression (4). Based thereon, the fact that in the case of a full-close control system without modification, the position loop gain is not increased compared to a semi-close control system can be explained.

Thus, the "causes for the recurrence of vibration that is lower in frequency than the vibration that occurs in the position loop" is clarified (Problem 1 of the prior arts can be solved).

Figure 7:
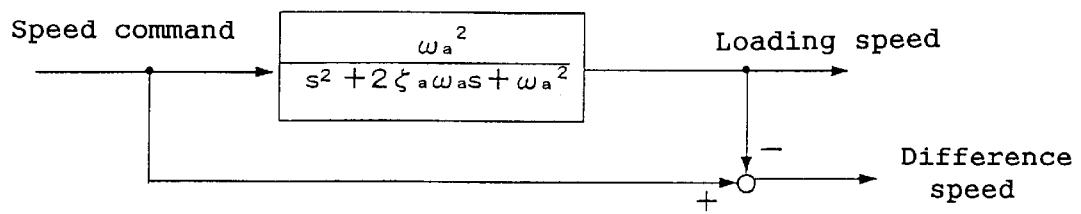
FIG. 7 is a diagram showing a difference speed between the speed command and loading speed shown in FIG. 6.

Now, principles of the present invention will be described by numerical expressions. As shown in FIG. 7, when a transfer function from the speed command to the difference speed (the difference between the speed command and loading speed) is calculated, $$G(s) = \frac{s^2 + 2\zeta_a \omega_a s}{s^2 + 2\zeta_a \omega_a s + \omega_a^2} \qquad (5)$$

is provided.

Since $\zeta_a$ is on the order of 0.1, with a frequency in the vicinity of $\omega_a$, the numerator of expression (5) can be approximated as $$s + 2\zeta_a \omega_a \approx s \qquad (6).$$

Based on expression (6), expression (5) can be approximated as $$G(s) = \frac{s^2}{s^2 + 2\zeta_a \omega_a s + \omega_a^2}. \qquad (7)$$

Figure 8:
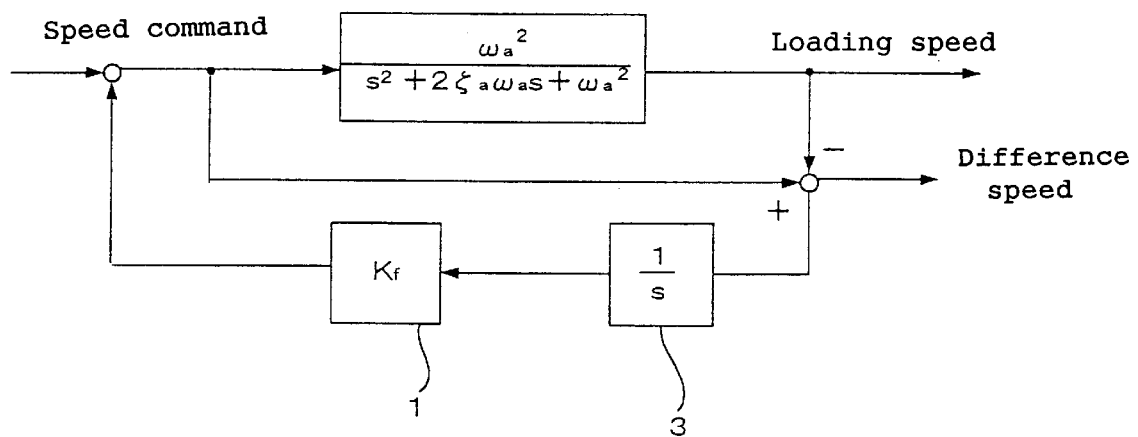
FIG. 8 is a diagram showing a correction of the speed command by means of the proportional gain means shown in FIG. 1.

Since the numerator of expression (7) is a quadratic equation, in the present first embodiment, as shown in FIG. 8, the difference speed signal is integrated by an integrating means and the integrated value is then multiplied by feedback gain $K_f$ by a promotional gain means 1 for an addition to the speed command, whereby providing a new speed command.

In FIG. 8, when a transfer function from the speed command to the loading speed is calculated, $$G(s) = \frac{\omega_a^2}{s^2 + (2\zeta_a + K_f)s + \omega_a^2} \qquad (8)$$

is provided.

In expression (8), since the coefficient of the first-degree term of s of the denominator polynomial increases due to the feedback gain $K_f$, it can be proved that the resonance characteristics are damped.

In FIG. 8, when a full-close position control system is constructed outside the speed control system from the speed command to the loading speed (unillustrated), a transfer function from a position command to a loading position is provided as $$G(s) = \frac{K_p \omega_a 2}{s^3 + (2\zeta_a \omega_a + K_f)s^2 + \omega_a^2 s + K_p \omega_a^2}. \qquad (9)$$

Based on expression (9), when Routh-Hurwitz stability conditions are calculated, $$K_p < 2\zeta_a \omega_a + K_f \qquad (10)$$

is provided. Therefore, according to the present embodiment, it is verified that the upper limit of the position loop gain $K_p$ is restored by the feedback gain $K_f$, whereby the position loop gain $K_p$ can be increased without causing recurrence of vibration.

Thus, the problem such that the substantial position loop gain cannot be increased in the full-close control system (Problem 2) can be solved.

Furthermore, as mentioned above, from the motor speed to the straight-line motion position signal, the high-frequency content of the motor speed is sufficiently attenuated due to integral characteristics of the mechanism. A speed command is created from the difference between the position command and straight-line motion position signal and, moreover, a feedback to, the speed command is carried out after integral processing, therefore, it can be considered that the construction of the present invention rarely influences stability of the speed loop and independent of the speed loop, the position loop gain can be increased.

Since the present invention is based on this examination, the problem of the prior arts (Problem 3) such that vibration of the speed loop occurs when vibration of the position loop has been reduced can be solved.

Now, construction of the overall control system will be described with reference to FIG. 1.

First, by feeding back a straight-line motion position signal outputted from a linear scale (unillustrated), a position control system is constructed and by multiplying the difference between a position signal and the straight-line motion position signal by position loop gain ($K_p$) 11, a first speed command is provided. A stabilization compensator 12 of a speed control system 10 receives an input of the difference between a second speed command (which will be described later) and an angular velocity signal of a motor (unillustrated) and outputs a torque command signal to a torque controller (unillustrated) comprising the motor and a means (unillustrated) for controlling the torque of the motor. By means of a control portion of the mortar, which is shown by a broken line, control is performed.

An output from an adding means for receiving a first speed command signal and a vibration-damping signal from the proportional gain means ($K_f$) 1 is provided as the second speed command. A differentiating means 2 outputs a straight-line motion speed signal by differentiating the straight-line motion position signal. A difference signal between the straight-line motion speed signal and second speed command is integrated by an integrating means 3 and is then inputted into the proportional gain means 1. The proportional gain means 1 multiplies the integrated value by appropriate gain $K_f$ and outputs the vibration-damping signal. Thus, the position loop gain can be increased in a stable condition.

Now, a second embodiment of the present invention will be described with reference to the drawings.

Figure 9:
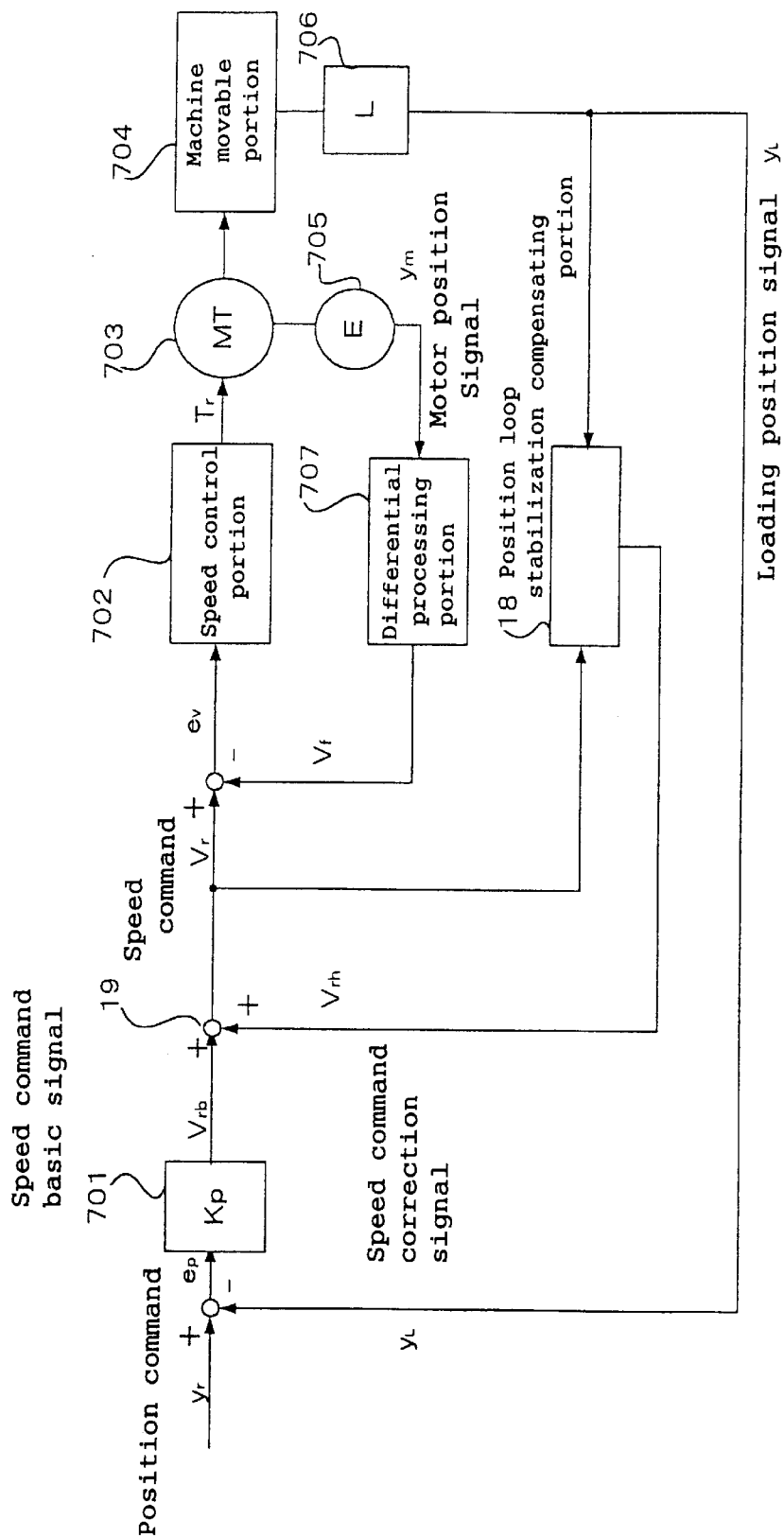
FIG. 9 is a block diagram of the position controller for a motor according to a second embodiment of the present invention.

FIG. 9 is a block diagram of the position controller for a motor according to the second embodiment of the present invention.

Figure 10:
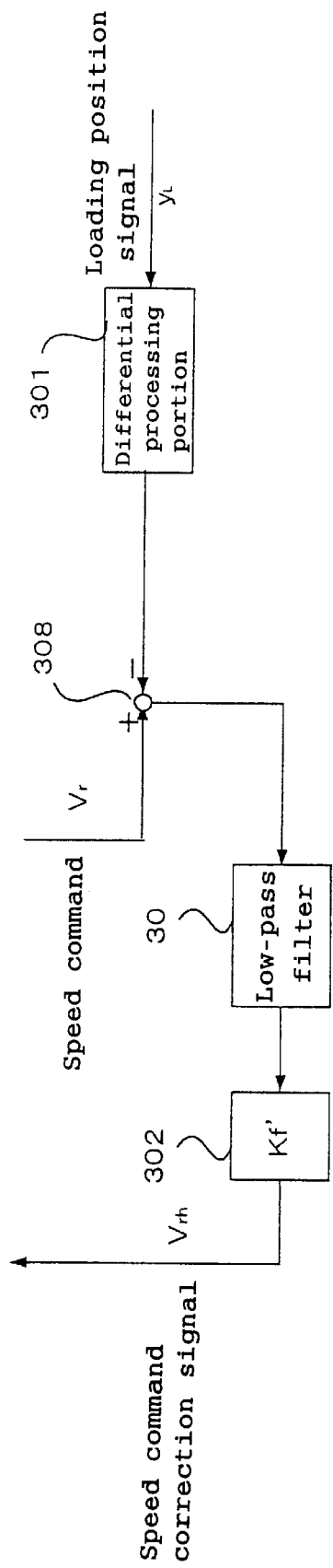
FIG. 10 is a block diagram of the position loop stabilization compensating portion as shown in FIG. 9.

FIG. 10 is a block diagram of the position loop stabilization compensating portion as shown in FIG. 9.

Figure 13:
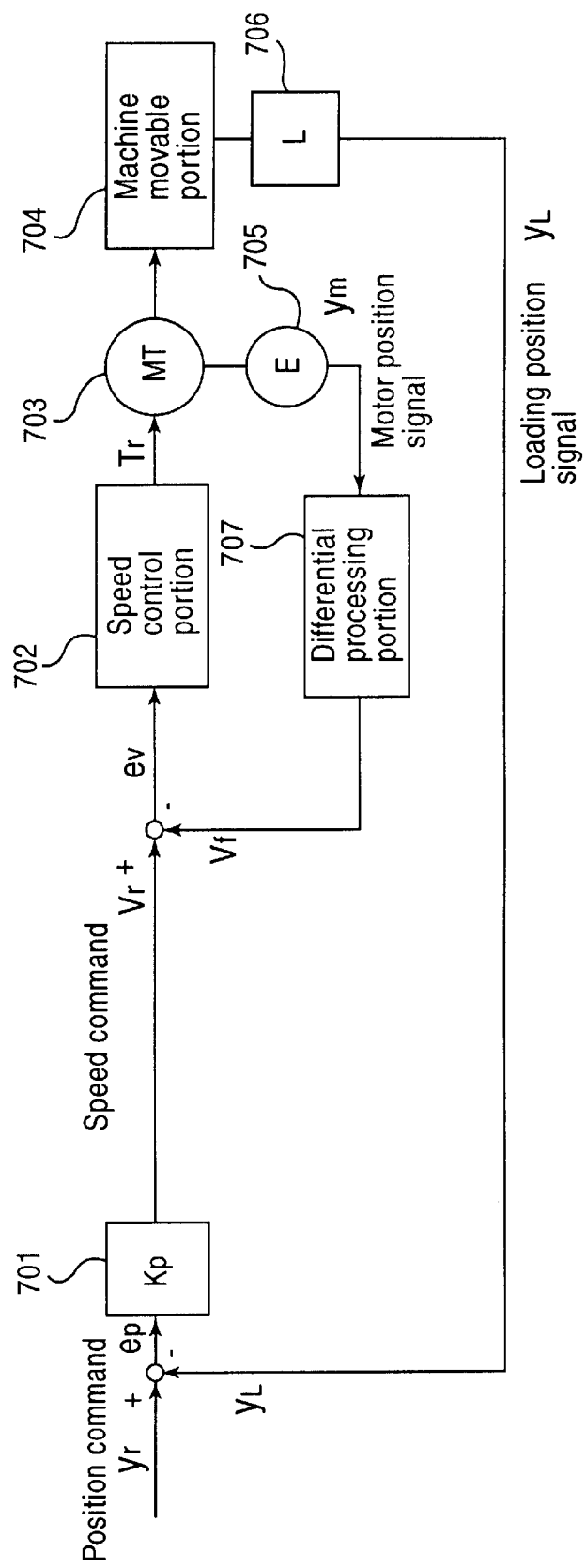
FIG. 13 is a block diagram of the prior full-close control system.

The second embodiment as shown in FIG. 9 is a full-close control system constructed by newly combining a position loop stabilization compensating portion 18 with the prior art of FIG. 13, and a point which is different from FIG. 13 in terms of construction is in that the position loop stabilization compensating portion 18 for outputting a speed command correction signal $V_{rh}$ and an adding means 19 for composing a speed command basic signal $V_{rb}$ and the speed command correction signal $V_{rh}$ are added. Identical symbols are used for other constructional elements that are identical to those of FIG. 13 and a repeated description will be omitted.

Now, operations will be described.

FIG. 10 is a detailed block diagram of the position loop stabilization compensating portion 18 shown in FIG. 9 and 30 denotes a secondary low-pass filter as a phase adjusting means. The difference between a speed command $V_r$ and a loading speed $V_L$ obtained by differentiating a loading position signal $Y_L$ by a differentiating circuit 301 is determined by a subtracting circuit 308 and this is inputted to the low-pass filter 30. A parameter of the low-pass filter 30 is set so that an output signal from the low-pass filter 30 is phase-delayed by 90° compared to an input signal with an oscillatory frequency, the output signal from the low-pass filter 30 is multiplied by appropriate compensating gain $K_f'$ so as to become the speed command correction signal $V_{rh}$, and this is added to the speed command basic signal $V_{rb}$ by an adder 19.

According to the second embodiment as such, since a resonance signal of the position loop which is contained in the speed command basic signal $V_{rb}$ is cancelled out by the speed command correction signal $V_{rh}$, the position loop gain $K_p$ can be increased. Furthermore, since no integral terms are included, no steady-state deviation remains, thus enabling highly accurate positioning.

Now, a third embodiment of the present invention will be described with reference to the drawings.

Figure 11:
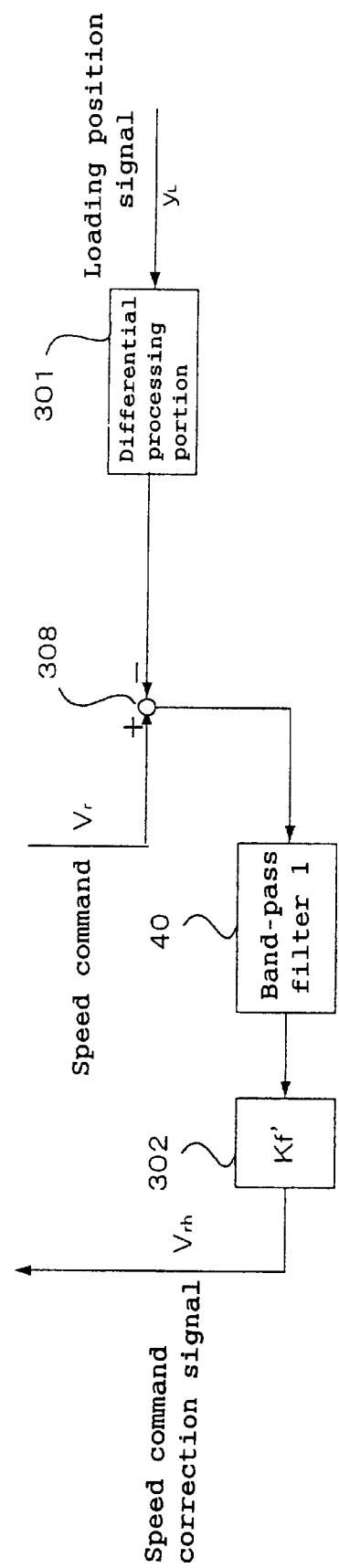
FIG. 11 is a block diagram of the position loop stabilization compensating portion according to a third embodiment of the present invention.

FIG. 11 is a block diagram of the position loop stabilization compensating portion according to the third embodiment of the present invention.

A point where FIG. 11 is different from FIG. 10 is in that in place of the low-pass filter 30, a band-pass filter 40 composed of a secondary low-pass filter and a primary high-pass filter is employed. Identical symbols are used for other constructional elements that are identical to those of FIG. 10 and a repeated description will be omitted. Herein, FIG. 9 is commonly used.

Now, operations will be described.

The difference between a speed command $V_r$ and a loading speed $V_L$ obtained by differentiating a loading position signal $Y_L$ by the differential processing portion 301 is inputted into the band-pass filter 40. A parameter of the band-pass filter 40 is set so that an output signal from the band-pass filter 40 is phase-delayed by 90° compared to an input signal with an oscillatory frequency, the output signal from the band-pass filter 40 is multiplied by appropriate compensating gain so as to become a speed command correction signal $V_{rh}$.

As above, in the third embodiment, according to this compensating method, compared to the case of FIG. 10, not only vibration-damping effects are provided but also, owing to an addition of the high-pass filter, influences due to a low-frequency disturbance signal exerted on the loading position signal such as base oscillation and the like can be relieved accordingly.

Now, a fourth embodiment of the present invention will be described with reference to the drawings.

Figure 12:
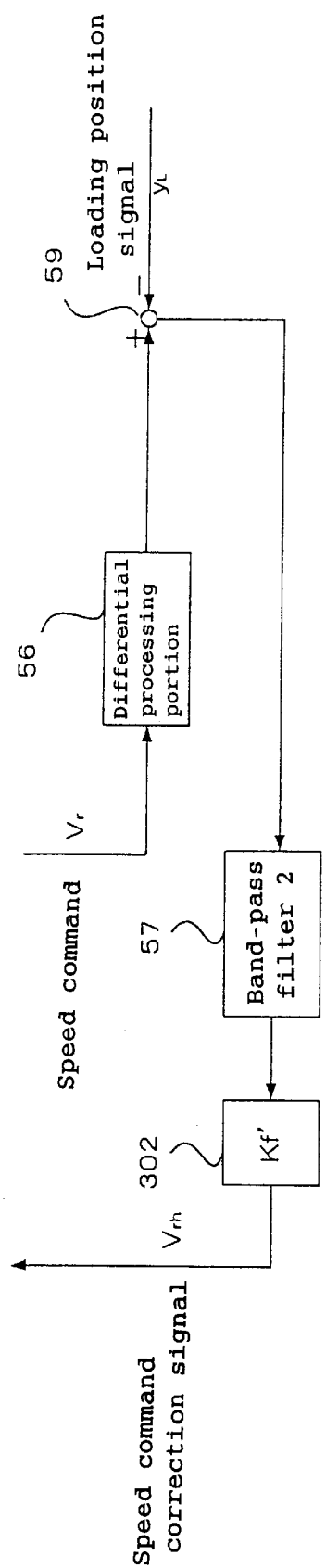
FIG. 12 is a block diagram of the position loop stabilization compensating portion according to a fourth embodiment of the present invention.

FIG. 12 is a block diagram of the position loop stabilization compensating portion according to the fourth embodiment of the present invention.

A point of difference between FIG. 12 and FIG. 10 is in that an integrating processing portion 56 for a speed command $V_r$ is provided and a band-pass filter 57 is composed of a primary low-pass filter and a primary high-pass filter is employed. Identical symbols are used for other constructional elements that are identical to those of FIG. 11 and a repeated description will be omitted.

Now, operations will be obtained.

The difference between a signal obtained by integrating a speed command $V_r$ by the integrating processing portion 56 and a loading position signal $Y_L$ is inputted into the band-pass filter 57. 59 denotes a subtracting means. A parameter of the band-pass filter 57 is set so that an output signal from the band-pass filter 57 has a same phase as that of an input signal with an oscillatory frequency, and the output signal from the low-pass filter 57 is multiplied by appropriate compensating gain $K_f'$ so as to become a speed command correction signal $V_{rh}$.

As above, according to the fourth embodiment, compared to FIG. 11, the same effects can be obtained in this case, however, since the low-pass filter is a primary low-pass filter, constructing the compensator and adjusting the parameter become easy.

As has been described in the foregoing, according to the present invention, the effect can be provided such that in position control for the full-close control system, owing to effects of the feedback gain $K_f$, the position loop gain $K_p$ can be restored to a value equivalent to that of a semi-close control system without causing recurrence of vibration.

In addition, since a resonance signal of the position loop which is contained in the position command basic signal can be cancelled out by the speed correction signal which has been adjusted by means of the phase adjusting means such as the low-pass filter, band-pass filter and the like, there is an effect such that the position loop gain can be increased and also, since no integral terms are included, no steady-state deviation remains, there is an effect such that it becomes possible to carry out highly accurate positioning in a short time.

INDUSTRIAL APPLICABILITY

The position controller according to the present invention is suitable for use in high-speed and highly accurate position control for industrial machines such as semiconductor manufacturing devices and the like.

What is claimed is:

1. A position controller for a motor where a straight-line motion position signal representing the position of a movable table and outputted from a straight-line motion position sensing means attached to a straight-line motion mechanism is used as a position feedback signal comprising:

a differentiating means for differentiating said straight-line motion position signal and outputting a straight-line motion speed signal, a subtracting means for calculating the difference between a speed command signal and said straight-line motion speed signal, an integrating means for integrating a difference signal outputted from said subtracting means, a proportional gain means for receiving the output signal from said integrating means, and an adding means for adding an output signal from said proportional gain means to said speed command signal and outputting a new speed command.

2. A position controller for a motor where speed control is performed based on a speed signal obtained by differentiating a rotational position signal of the motor and also position, control is performed based on a loading position signal from a position sensor attached to a load riven by the motor comprising:

a differentiating means for differentiating said rotational position signal and outputting a loading speed signal, a subtracting means for calculating the difference between said loading speed signal and a speed command signal, a phase adjusting means for performing phase adjustment by inputting a difference signal outputted from said subtracting means into a low-pass filter, a proportional gain means for receiving an output signal from said phase adjusting means, and an adding means for adding an output signal from said proportional gain means to said speed command signal and outputting a new speed command.

3. A position controller for a motor as set forth in claim 2, wherein said phase adjusting means performs phase adjustment by inputting a difference signal outputted from said subtracting means into a band-pass filter.

4. A position controller for a motor where speed control is performed based on a speed signal obtained by differentiating a rotational position signal of the motor and also position control is performed based on a loading position signal from a position sensor attached to a load driven by the motor comprising:

an integrating calculation means for integrating a speed command signal, a subtracting means for calculating the difference between said loading position signal and an integrated position signal outputted from said integrating calculation means, a phase adjusting means for performing phase adjustment by inputting a difference signal outputted from said subtracting means into a band-pass filter, a proportional gain means for receiving an output signal from said phase adjusting means, an adding means for adding an output signal from said proportional gain means to said speed command signal and outputting a new speed command.

* * * * *